United States Patent [19]
Collins

[11] Patent Number: 5,620,020
[45] Date of Patent: Apr. 15, 1997

[54] PLUMBING APPARATUS

[76] Inventor: John W. Collins, The Barn, Mill Lane, Castleton, Gwent, United Kingdom, CF3 8UT

[21] Appl. No.: 401,888

[22] Filed: Mar. 10, 1995

Related U.S. Application Data

[63] Continuation-in-part of Ser. No. 133,006, Nov. 9, 1993, abandoned.

[30] Foreign Application Priority Data

| Apr. 9, 1991 | [GB] | United Kingdom | 9107505 |
| Apr. 8, 1992 | [WO] | WIPO | PCT/GB92/00629 |

[51] Int. Cl.$^6$ .......................... F16K 43/00; F16L 41/06; B23B 41/08
[52] U.S. Cl. ................. 137/318; 30/96; 83/745; 222/91
[58] Field of Search .................. 30/94, 95, 93, 30/96; 83/54, 745; 137/15, 315, 318; 138/94, 97; 222/5, 80, 83, 91; 408/79, 83, 95, 97, 101

[56] References Cited

U.S. PATENT DOCUMENTS

| 2,515,260 | 7/1950 | Pichler | 137/318 |
| 2,841,314 | 7/1958 | Munson et al. | 251/95 |
| 2,984,129 | 5/1961 | Allen | 137/318 |
| 3,032,867 | 5/1962 | Kerr | 29/213.1 |
| 3,532,113 | 10/1970 | McKean | 137/318 |
| 3,687,166 | 8/1972 | Herrin | 137/318 |
| 3,766,979 | 10/1973 | Petrick | 166/55 |
| 3,833,020 | 9/1974 | Smith | 137/318 |
| 3,863,667 | 2/1975 | Ward | 137/318 |
| 3,983,897 | 10/1976 | Gebelius | 137/318 |
| 4,177,827 | 12/1979 | Smith et al. | 137/318 |
| 4,215,749 | 8/1980 | Dare et al. | 166/361 |
| 4,411,459 | 10/1983 | VerNooy | 137/318 |
| 4,415,000 | 11/1983 | Odmann | 137/318 |
| 4,434,809 | 3/1984 | Rogstadius | 137/318 |
| 4,516,593 | 5/1985 | Muto | 137/318 |
| 4,540,011 | 9/1985 | Croxford et al. | 137/318 |
| 4,552,170 | 11/1985 | Margrave | 137/318 |
| 4,730,636 | 3/1988 | Volgstadt et al. | 137/318 |
| 4,809,735 | 3/1989 | Volgstadt et al. | 137/318 |
| 5,152,310 | 10/1992 | O'Bryon | 137/318 |
| 5,316,037 | 5/1994 | Martin | 137/318 |

FOREIGN PATENT DOCUMENTS

| 646537 | 11/1928 | France | 137/318 |

Primary Examiner—George L. Walton
Attorney, Agent, or Firm—Young & Thompson

[57] ABSTRACT

A plumbing device comprises a clamp 10 which is clamped around a "live" pipe 12 and which threadedly receives a cutter/valve 16 having cutter portions 30 and a valved passage 32. The cutter/valve 16 is screwed home to remove a section of pipe and to align the valved passage with the pipe. The device may then function as a stop-cock.

16 Claims, 6 Drawing Sheets

PLUMBING APPARATUS

This application is a continuation-in-part of application Ser. No. 133,006, filed Nov. 9, 1993, and now abandoned.

This invention relates to plumbing apparatus for being applied to a pipe and operated to prevent or reduce fluid flow along the pipe. In particular, but not exclusively, the invention extends to a plumbing device of this type which may later function as a valve for controlling flow along the pipe.

When carrying out building work it is often necessary to isolate a water supply. This is easily done if the stop cock is accessible and can be turned off. However, this is often not possible and so it becomes necessary to call out a plumber and/or the Water Board to assist. This results in delay and added cost.

DESCRIPTION OF THE PRIOR ART

U.S. Pat. No. 4,730,636 (Volgstadt et al) describes an arrangement for tapping a tubular member, in which a combination valve and cutting tool is driven to penetrate the wall of the tubular member. Although this arrangement allows the tapped flow to be controlled, it does not allow control or closing off of the flow along the pipe.

U.S. Pat. No. 4,415,000 (Ödmann) also discloses a device for tapping into a pipe, but does not suggest any way in which flow along the pipe may be controlled or closed off.

Likewise U.S. Pat. No. 4,434,809 (Rogstadius) discloses a pipe coupling for coupling a branch pip to a feed pipe but there is no provision for inserting a control valve into the feed pipe to control or close off flow therealong.

Accordingly, in one aspect this invention provides plumbing apparatus for being attached to a length of pipe or other fluid-carrying means and being operable to interpose in said pipe or other fluid-carrying means externally operable means for controlling the flow therealong.

Preferably, said plumbing device comprises first means for being applied to a pipe and second means engageable or associated with said first means and operable to initially open said pipe and thereafter operable to close said pipe.

Preferably said first and second means are threadedly engageable and said second means includes a cutter element such as a hardened tooth or series of teeth for scribing out a part or a section of the pipe when the second means is threaded into or onto said second means.

Said first means is preferably in two parts clampable to the pipe to either side of the section to be removed or opened.

Said second means preferably includes an internal passage means for receiving fluid flowing through said pipe and valve means operable externally to control said fluid flow.

Said second means is preferably of generally cylindrical form including a recess or void adjacent the cutter element for receiving the material or section removed from said pipe.

Whilst the invention has been described above, it includes any inventive combination of features defined above or disclosed herein.

The invention may be performed in various ways and four embodiments thereof will now be described in detail by way of example only, reference being made to the accompanying drawings, in which.

The four illustrated embodiments of plumbing device are intended to be applied to insert a stop tap in a "live" pipe carrying water, gas or other fluid without requiring draining down or isolation of the pipe.

In general, the illustrated embodiments comprise a split two part clamp 10 (herein referred to as "first means") which is fitted around a pipe 12 and has a threaded bore 14 which receives a threaded cutter/valve 16 (herein referred to as "second means"). In use, the cutter/valve 16 is screwed into the clamp 10 so that the cutter/valve 16 removes a section of the pipe and then interposes sealingly a valve between the two severed ends of the pipe.

Figure 1:
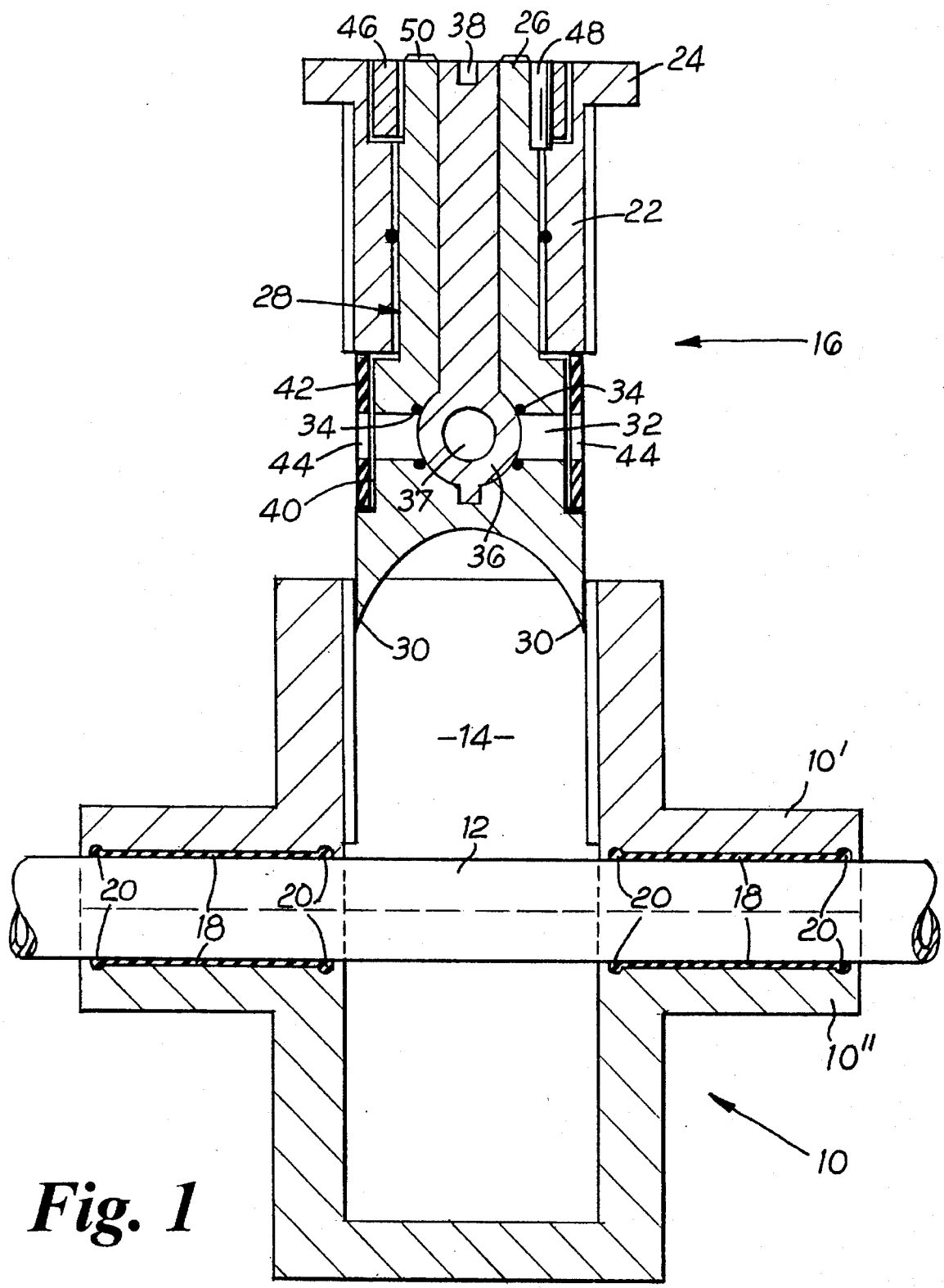
FIG. 1 is a cross-sectional view of a first embodiment of plumbing device in accordance with the invention before the device has been used to cut the pipe.
Figure 2:
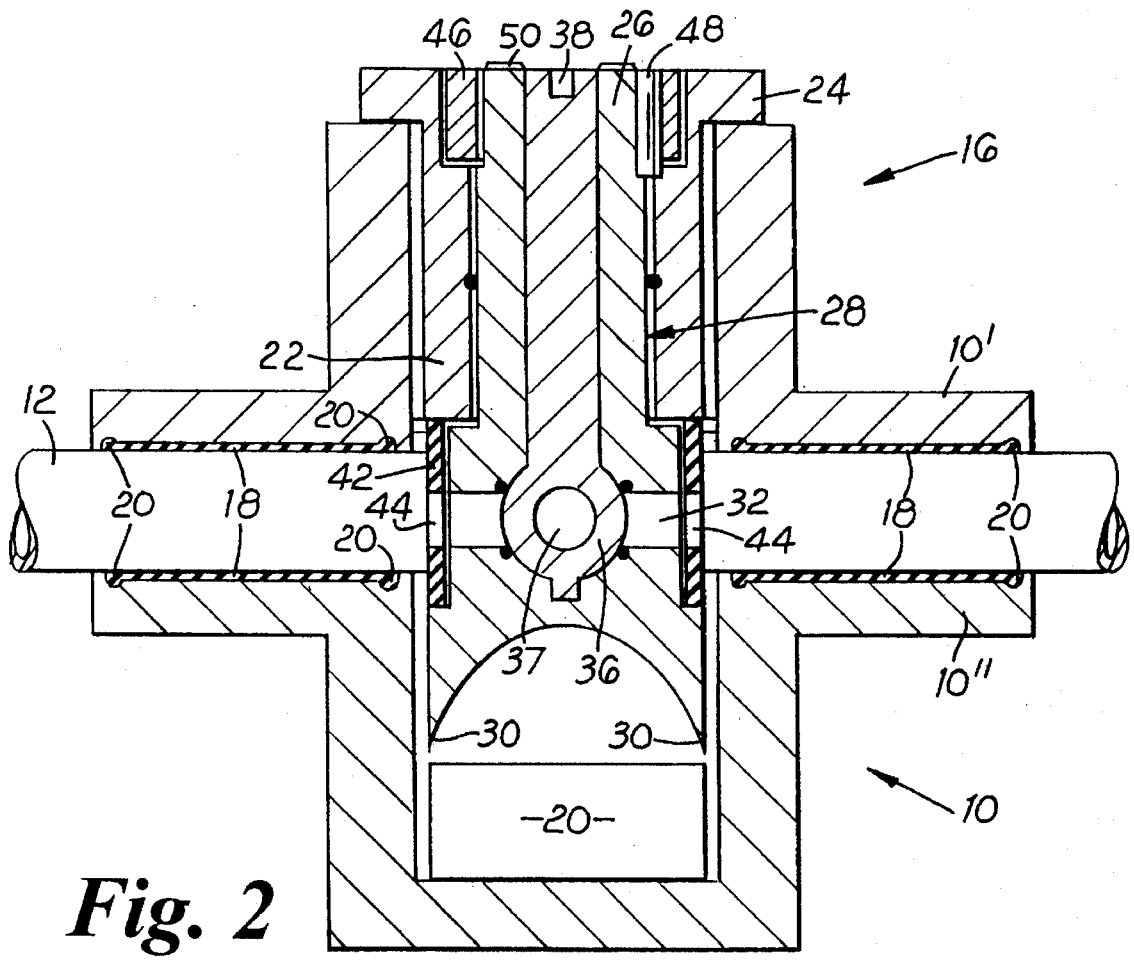
FIG. 2 is a cross-sectional view of the embodiment of FIG. 1 with the pipe cut and the device functional as a stop tap.
Figure 3:
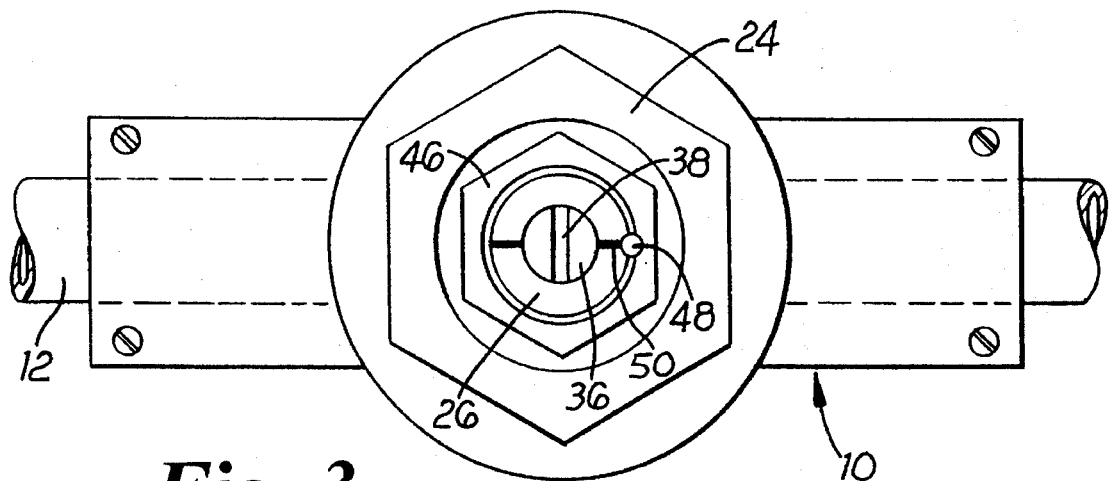
FIG. 3 is a top plan view of the embodiment of plumbing device illustrated in FIGS. 1 and 2.
Figure 7:
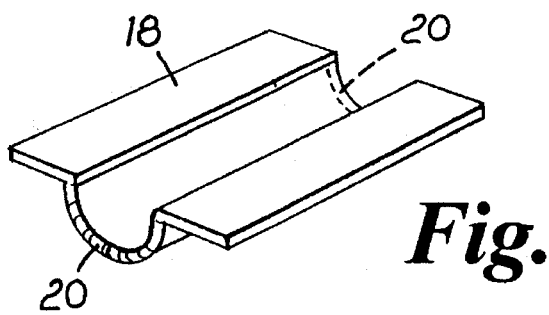
FIG. 7 is a perspective view of a seal sleeve for either of the first or second embodiments.

Referring now specifically to FIGS. 1 to 3, the first embodiment of clamp 10 is split along a horizontal plane into upper and lower parts 10' and 10" respectively, and is sealed to the pipe 12 by seal strips or sheets 18 which are located in position by lips 20 formed integrally with the sheets and locating in grooves in the upper and lower clamp parts. The form of the sheet is illustrated in FIG. 7. The upper and lower parts 10', 10" are secured together by suitable means (not shown) such as bolts, shackles etc.

The assembled clamp 10 defines a threaded bore 14 and, in its lower portion, a chamber for receiving a severed section 20 of pipe.

Figure 6:
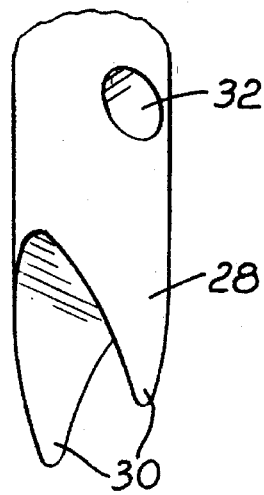
FIG. 6 is a perspective view of an example of cutting profile for either of the first or second embodiments.

The cutter/valve 16 comprises an outer threaded sleeve 22 with a hex drive 24 at its upper end. Rotatably received in the bore of the sleeve 22 is the shaft 26 of the cutter/valve element 28 which carries at its lower end two sharpened portions 30, the profile of which may be better seen from FIG. 6. Above the sharpened portions 30 the cutter/valve element includes a transverse bore 32 and associated seals 34 which co-operate with a rotatable valve member 36 which has a part spherical portion with a transverse bore 37 which can be brought into line with the bore 37 in the cutter/valve element. At its upper end the valve member 36 has a slot or marker 38 aligned with the bore 37.

Just above the sharpened portions 30, the cutter/valve element 28 has a cylindrical portion 40 of reduced diameter which extends upwardly beyond the bore 32 for a total distance somewhat greater than the diameter of the pipe 12. Around the cylindrical portion is fitted a seal sleeve 42 of a compressible rubber or rubber-like material with apertures 44 next to the ends of the bore 32. The upper portion of the seal sleeve 42 projects above an inwardly directed shoulder of the cutter/valve element 28 to face the lower end of the sleeve 22. The cutter/valve element 28 is threaded at its upper end and engages a nut 46 received in a recess in the upper end of the sleeve 22. Tightening the nut 46 draws the cutter/valve element upwardly relative to the sleeve, so compressing the seal sleeve 42.

The cutter/valve element 28, the valve member 36 and the sleeve 22 are initially kept fast with each other by a removable locking pin 48. The upper end of the cutter/valve element 28 also has a slot or other marker 50 aligned with the bore 32 in its lower end.

In use, the two parts of the clamp 10 are applied to the required section of the pipe 12 and secured tightly to the pipe. The cutter/valve 16, comprising the cutter/valve element 28, the valve member 26 and the sleeve 22 fixed with respect to each other by the pin 48 (with the valve closed) is threadedly engaged with the bore 14 and screwed down using a wrench or the like on the hex drive 24. The sharpened portions 30 of the cutter scribe through the pipe to sever a section 20. The lower portion of the hex drive 24 eventually sealingly engages the flat on the clamp 10 which surrounds the bore 14, and the severed section 20 falls into the lower part of the clamp.

The locking pin 48 is then removed and the cutter/valve element 28 rotated to bring the duct 32 into alignment with the pipe 12, using the marker 50 as a cue. Nut 46 is then tightened to compress the seal sleeve 42 to form a good seal between the severed ends of the pipe 12 and the bore 32, and then locked again if required.

The device is now ready to function as a stop tap and may be operated by inserting the blade of a screwdriver into the slot 38 in the upper end of the valve member 36.

Figure 4:
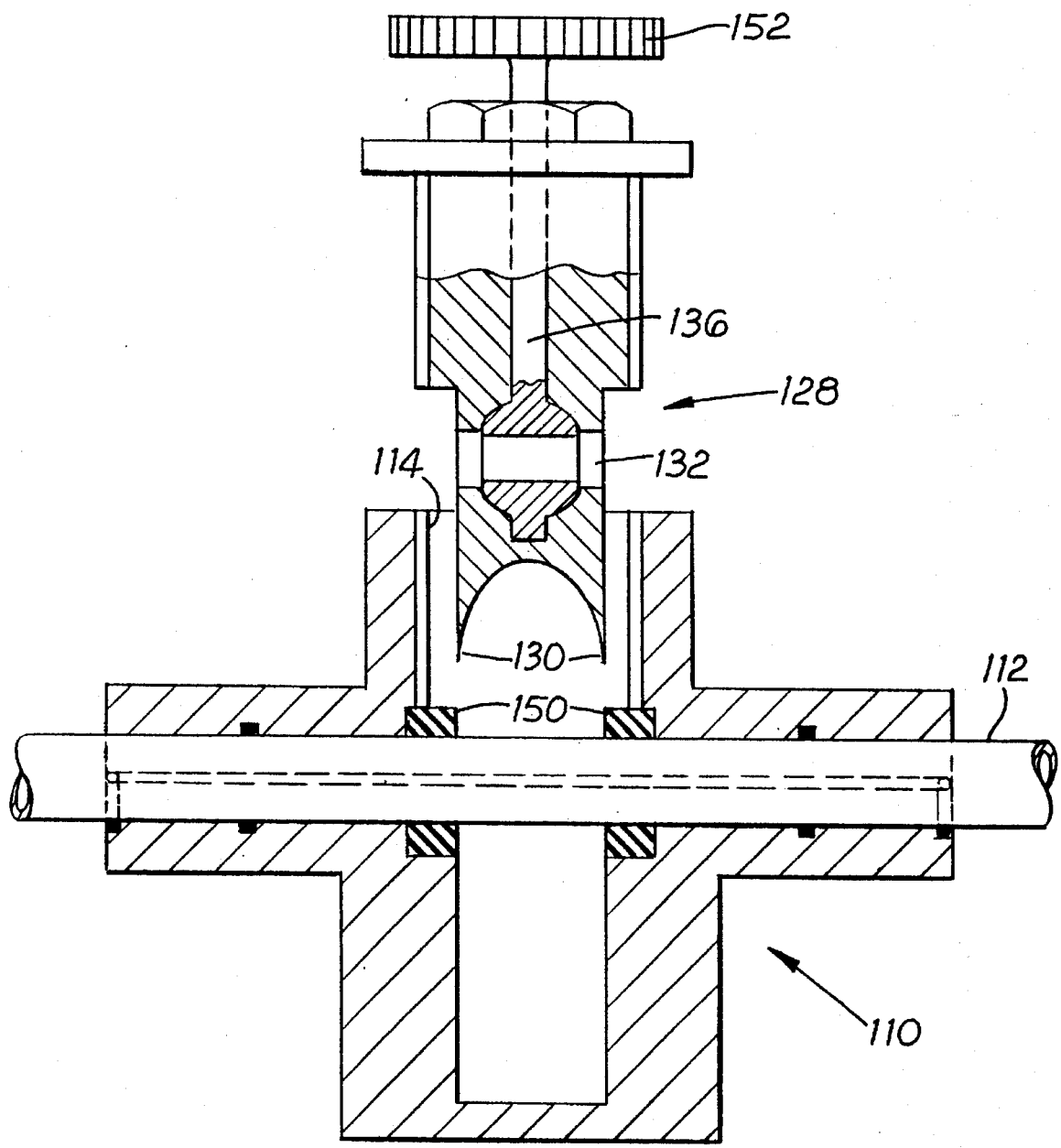
FIG. 4 is a cross-sectional view of a second embodiment of plumbing device in accordance with the invention before the device has been used to cut the pipe.
Figure 5:
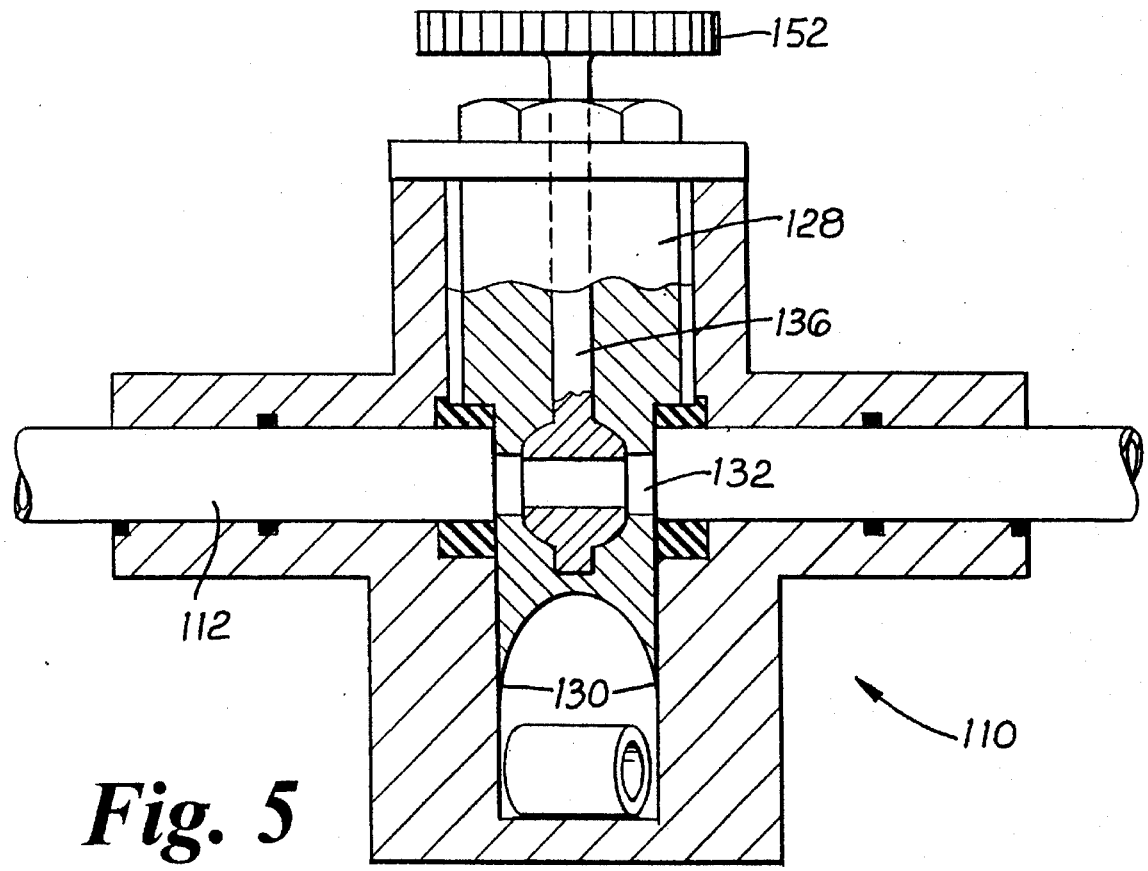
FIG. 5 is a cross-sectional view of the embodiment of FIG. 4 with the pipe cut and the device functional as a stop tap.

Referring now to the embodiment of FIGS. 4 and 5, similar parts will be given the corresponding reference numerals prefixed by "1". The clamp 110 is of similar form to that of the previous embodiment, except that here the seals 150 which provide sealing between the severed ends of the pipe are located in the clamp 110 rather than on the cutter/valve element 128. Also the construction of the cutter/valve element 128 is somewhat simpler. It is externally threaded to be engaged in the bore 114 of the clamp 110. The cutter/valve element 128 has cutter portions 130 and a transverse bore 132. The bore 132 is opened and closed by a rotatable valve member 136 using a handwheel 152.

In use, the clamp 110 is applied and secured to the pipe as before and the cutter/valve element 128 engaged with the bore and screwed fully home, severing the pipe section 120 and bringing the bore 132 into registration with the pipe 112. In this second embodiment, the threads are designed to ensure that such registration occurs automatically. As the lower end of the cutter/valve element 128 nears its fully home position, it compresses the seals 150 to effect a tight seal between the pipe and the valve/cutter element 128. The device may now be operated as a stop tap using the handwheel 152.

It will be appreciated that many variations are possible, for example many different types of valving may be used such as gate valves, butterfly valves etc. instead of the ball valve shown.

Figure 8:
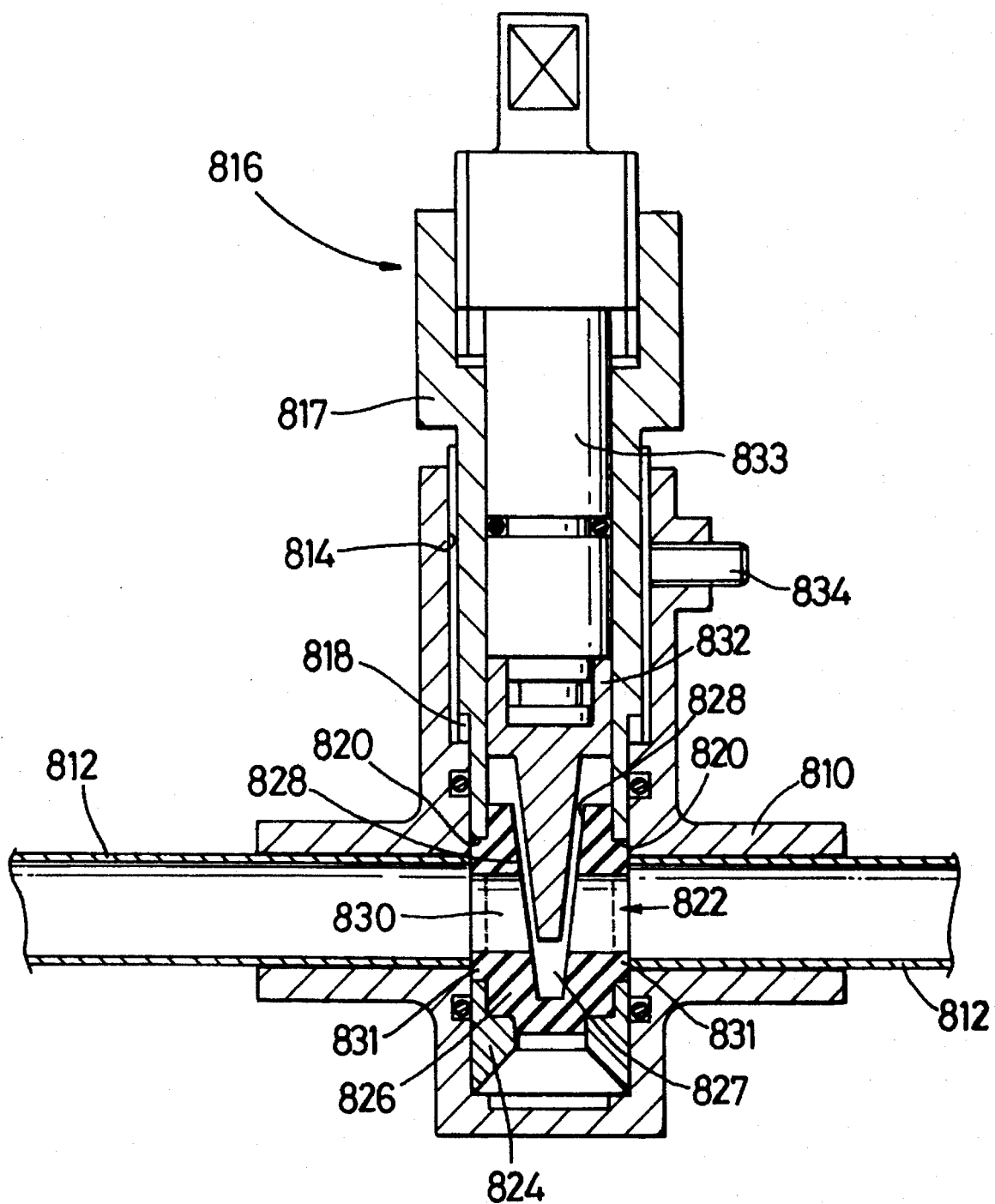
FIG. 8 is a cross-sectional view of a third embodiment of this invention applied to a pipe.

Referring now to FIG. 8, a split two-part clamp 810 is fitted around the pipe 812 and has a threaded bore 814 which receives the threaded portion of a cutter sleeve 817 of a cutter/valve combination 816. The cutter sleeve 817 continues downwardly beyond the threaded portion to define smaller diameter portion 818 which has transverse apertures 820 defining a flow passage 822 for flow passing along the pipe 812. The foot of the cutter sleeve 817 terminates with a saw-toothed ring cutter 824 adapted in use to cut a hole through the pipe 812 of diameter somewhat greater than the pipe diameter, so as to leave two concavely curved exposed pipe ends.

Within the cutter sleeve 817 is disposed a resiliently compressible Neoprene (TM) insert 826 which comprises a plug with an internal cavity 827 with tapering sides 828, a transverse bore 830 and two annular ribbed portions 831 which, when the insert is unstressed, fit into the apertures 820 and define a generally smooth and continuous surface with the adjacent external surface of the smaller diameter portion 818.

Within the cutter sleeve 817, there is disposed a shut-off spindle 833 threadedly engaged at its upper end with a bore in the cutter sleeve 817. At its lower end the shut-off spindle 833 carries a tapered element 832 of complementary taper to the cavity 827. The tapered element 832 is dimensioned so that, when the device has been applied to a pipe, and the cutter sleeve 817 wound down to cut a portion out of the pipe, the shut-off spindle 833 may be wound down tightly to urge the tapered element 832 into the cavity 827 to use a wedge effect to cause the insert 826 to expand transversely to cause the ribbed portions 831 to seal tightly against the cut ends of the pipe and be compressed axially with respect to the pipe.

In this embodiment, the tapered element 832 also acts as a valve element, as when it is urged tightly into the recess 827 it will also prevent flow along the bore 830.

The ribbed portions 831 must be properly aligned with the cut ends of the pipe and this is achieved by providing a suitable notch or mark (not shown) on the cutter sleeve 817 indicating the direction of the bore 830 through the sleeve and a similar notch or mark (not shown) is caused to expand. The posts may be looked in the correct position by a grub screw 834.

Figure 9:
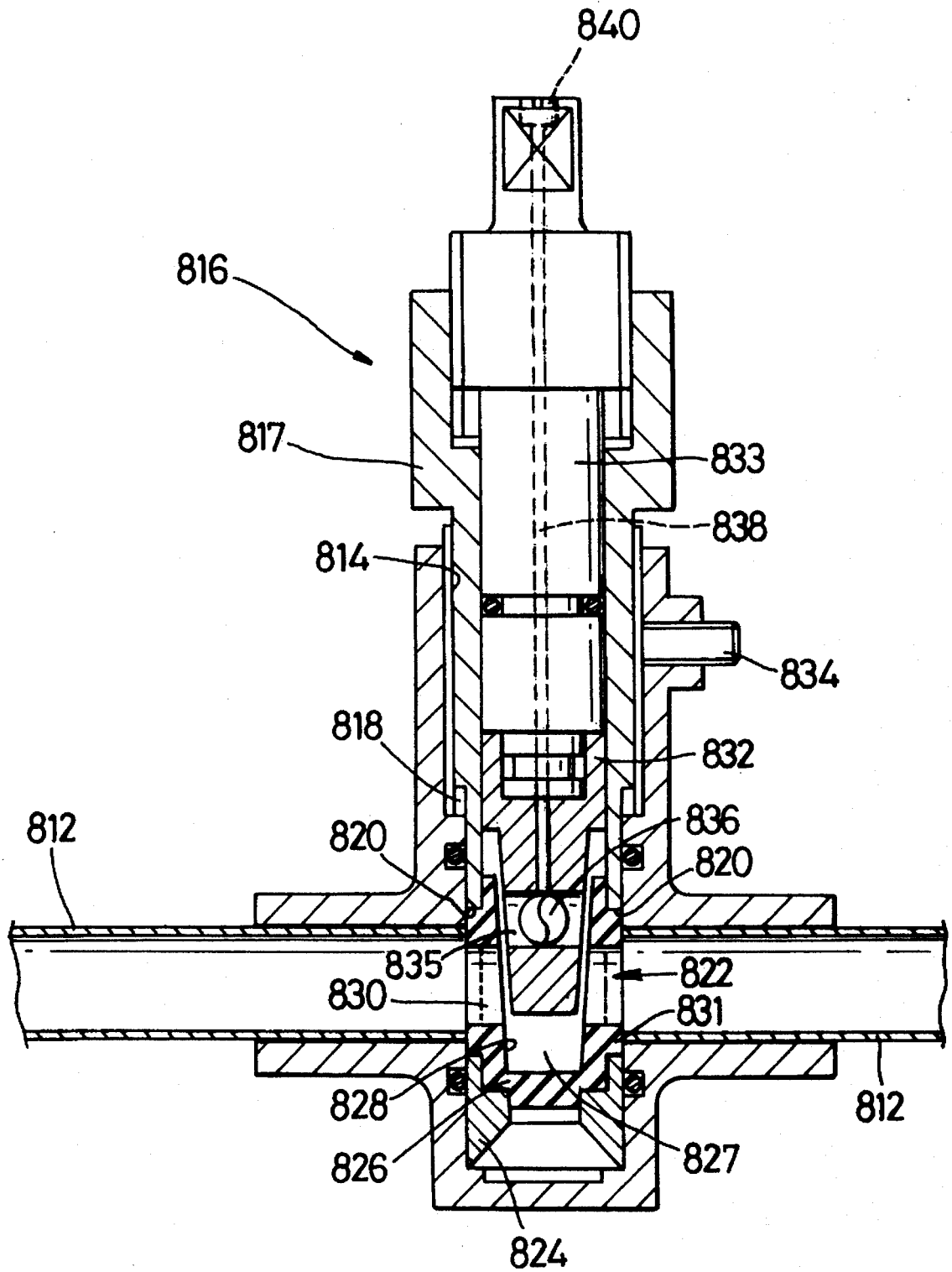
FIG. 9 is a cross-sectional view of a fourth embodiment of this invention, applied to a pipe.

The embodiment of FIG. 9, is identical in many respects to that of FIG. 8 and so will not be described in detail again. The embodiment is different in that the tapered element 832 serves only to seal the annular ribbed portions 831 of the insert 826 against the cut ends of the pipe, and does not act as a valve member. Instead, the tapered element 832 has a transverse bore 835 with a circular flap element 836 connected to the end of a valve stem 838 terminating in a slotted head 840. The valve element 836 may be opened and closed by turning the head 840 with a screw driver, to open or close the flow passage 822 through the device.

I claim:

1. Plumbing apparatus for being attached to a tubular element and being operable to interpose in said tubular element externally operable means for opening and closing the flow therealong, said apparatus comprising:

first means for being secured to said tubular element, and second means engageable with said first means for being advanced towards said tubular element in a generally transverse advancement direction, said second means including a distal cutter means for removing a portion of said tubular element and, adjacent said cutter means, a valve arrangement disposed within said second means, said valve arrangement in use being interposed in alignment with said tubular element following removal of said portion, said valve arrangement including a valve body portion extending across substantially the whole of the cross-section of said tubular element, said valve body portion defining a passage means extending generally transversely to said advancement direction, whereby substantially all of the fluid flowing along said tubular element passes through said passage means, and said valve arrangement including a valve control element located in said passage means selectively operable to open and close the flow of fluid along said tubular element.

2. Plumbing apparatus according to claim 1, wherein said cutter means comprises a sharpened portion.

3. Plumbing apparatus according to claim 2, wherein said cutter means comprises a series of teeth.

4. Plumbing apparatus according to claim 1, wherein said first means includes two parts sealingly clampable to the tubular element to either side of the part to be opened.

5. Plumbing apparatus according to claim 1, which further includes seal means for providing a seal between said passage means and the adjacent remaining portions of said tubular element.

6. Plumbing apparatus according to claim 5, wherein said seal means is resiliently compressible and means is provided for compressing said seal means to assist intimate contact between the passage means and the adjacent remaining portions of the tubular element.

7. Plumbing apparatus according to claim 6, wherein said seal means comprises a seal element associated with said second means and said second means includes threaded adjustment means for applying compression to said seal means.

8. Plumbing apparatus according to claim 6, wherein said compressing means includes means for urging said seal means transversely into contact with the ends of said remaining portions of said tubular element.

9. Plumbing apparatus according to claim 6, wherein said seal means comprises a seal element associated with said first means and arranged to be compressed when said second means is fully engaged therewith.

10. Plumbing apparatus according to claim 1, wherein said second means includes a cutter/valve element defining said cutting means and said valve arrangement, said cutter/valve element being rotatably received in an outer sleeve, said outer sleeve having an external thread for threadedly engaging said first means, and means for adjusting the angular position of said valve means relative to said outer sleeve.

11. Plumbing apparatus according to claim 10, including releasable locking means for preventing rotation of said cutter/valve element relative to said sleeve, and wherein said cutter/valve means includes marker means to indicate the orientation of said internal passage means.

12. Plumbing apparatus according to claim 1, wherein said first means is threadedly engaged with said second means.

13. Plumbing apparatus according to claim 1, wherein said cutter means is adapted to cut along a generally cylindrical cutting surface transverse to said tubular element.

14. Plumbing apparatus according to claim 13, wherein said cutter means is adapted to remove a length of said tubular element.

15. Plumbing apparatus for being attached to a tubular element and being operable to interpose in said tubular element externally operable means for opening and closing the flow of fluid therealong, said apparatus including first means attachable to the exterior of said tubular means, and second means threadably engageable with said first means and carrying cutter means operable to sever a portion from said tubular element when said second means is screwed into a first engagement position with said first means, said second means including valve control means disposed therein which upon further screwed engagement of said first and second means beyond said first position is sealingly interposed in alignment with portions of said tubular element left by said removed severed portion to form a fluid flow path between said portions; and which is selectively operable to open or close said fluid flow path said valve control means including a valve body portion which, extending across substantially the whole of the cross section tubular element, said valve body portion including said fluid flow path through which substantially all of the fluid flowing through said tubular element passes.

16. Plumbing apparatus according to claim 15, wherein said valve control means includes resiliently compressible seal means and means for applying to said seal means a sealing force acting generally parallel to the axis of said remaining portions of said tubular element.

* * * * *